United States Patent [19]

Barnes et al.

[11] Patent Number: 4,888,118

[45] Date of Patent: Dec. 19, 1989

[54] WATER PURIFICATION PROCESS AND APPARATUS EMPLOYING NYLON 4

[75] Inventors: Carl E. Barnes, New Canaan; Arthur C. Barnes, Norwalk, both of Conn.

[73] Assignee: Nyodine Products, Inc., Tuxedo, N.Y.

[21] Appl. No.: 183,006

[22] Filed: Apr. 18, 1988

[51] Int. Cl.$^4$ .......................... B01D 15/00; C02F 1/68
[52] U.S. Cl. .................................... 210/668; 210/674; 210/753; 210/764; 210/198.1; 210/501; 210/489; 210/314
[58] Field of Search ............... 210/668, 764, 753, 314, 210/198.1, 501, 489, 674

[56] References Cited

U.S. PATENT DOCUMENTS

| | | |
|---|---|---|
| 2,792,942 | 5/1957 | Feuillet ................. 210/501 |
| 3,216,579 | 11/1965 | Shelanski et al. ............ 210/501 |
| 3,408,295 | 10/1968 | Vaichulis ................. 210/753 |
| 3,429,655 | 2/1969 | Case ..................... 210/501 |
| 3,772,189 | 11/1973 | Kreusch et al. ............. 210/764 |
| 3,872,013 | 3/1975 | Nishino et al. ............. 210/501 |
| 4,025,426 | 5/1977 | Anderson et al. ........... 210/668 |
| 4,058,457 | 11/1977 | Manes .................... 210/674 |
| 4,555,347 | 11/1985 | O'Dowd et al. ............. 210/753 |

FOREIGN PATENT DOCUMENTS 1119748 3/1982 Canada ....................... 210/501

Primary Examiner—Richard V. Fisher
Assistant Examiner—Cynthia L. Nessler
Attorney, Agent, or Firm—Davis Hoxie Faithfull & Hapgood

[57] ABSTRACT

A process and apparatus employing nylon 4 for the purification of water comprising the steps of contacting the water with iodine in a first treatment zone; nylon 4 complexed with iodine rather than elemental iodine is preferably used and is contacted by the water in the first treatment zone where it releases iodine at levels sufficient to purify the water. The treated and purified water is then contacted with nylon 4 in a second treatment zone where the iodine is removed from the water. The apparatus comprises a conduit having an inlet and an outlet, with a first treatment zone containing nylon 4 material complexed with iodine and a second downstream treatment zone containing nylon 4. The nylon 4 material used in both treatment zones can be in any form, preferably a form having a high surface area. A suitably restrained moistened fine powder may be used as may be textured or untextured, drawn or undrawn, staple fiber, knitted or non-woven fabrics or pulp (fibrils).

28 Claims, 1 Drawing Sheet

WATER PURIFICATION PROCESS AND APPARATUS EMPLOYING NYLON 4

BACKGROUND OF THE INVENTION

1. Field of the Invention

This invention relates to the field of water treatment, and more particularly to the purification or sterilization of contaminated water using halogens, e.g., iodine and bromine. More specifically, the invention relates to methods and apparatus for the stepwise treatment of water for human or animal consumption perferably using iodine and the removal of the iodine to levels below that detectable by human taste or smell.

2. Description of the Prior Art

It has long been known that elemental iodine possesses bactericidal, viricidal and cysticidal properties and that because of this biocidal action, it is ideal for use as a water purifying agent. U.S. Pat. No. 3,408,295 discloses a method of purifying water for drinking purposes utilizing elemental iodine. However it is also known that the use of iodine in the purification of drinking water is not widely used because, although sterile, the water has an objectionable odor, color and taste due to the iodine present. As a practical matter, the use of iodine to provide sterilized or purified drinking water is used only in emergency situations or where there is no other alternative available. To meet the requirements of potable water which also has acceptable taste, the iodine remaining after the treatment must be removed.

U.S. Pat. No. 4,367,149 discloses a method of removing this elemental iodine by the reaction of sodium or potassium thiosulfate. However, although the iodine is removed, there is left in its place other inorganic salts such as sodium iodide. Furthermore, unless the exact stoichiometric amount of thiosulfate is used, either some iodine or the excess thiosulfate will be present. Other chemical methods for removal of the elemental iodine from the treated water have been proposed.

What is needed is a complexing agent, harmless to humans, which will act as a scavenging agent removing all the iodine but leaving nothing in its place. It is therefore an object of this invention to provide process and apparatus using a complexing agent which will quickly and completely remove all traces of iodine after its biocidal action has rendered the water safe for human and animal consumption.

It is also an object of this invention to provide a simple and economical method and apparatus for purifying and sterilizing water employing iodine or bromine which results in potable water which contains none of the characteristic taste or color of the elemental halogen employed as the biocidal agent.

It is a further object of this invention to provide a method as described above which can be practiced in either a batch or a continuous fashion.

It is another object of this invention to provide a method and apparatus in which the material employed to remove the halogen biocidal agent can be reactivated and reused repeatedly without loss in effectiveness.

SUMMARY OF THE INVENTION

It is disclosed in U.S. patent application Ser. No. 155,942 of Carl E. Barnes, filed on Feb. 16, 1988, as well as in some foreign patents, e.g. Canadian Patent No. 1,119,748, that polypyrrolidone also known as nylon 4, very readily forms a complex with iodine. It has been found that this tendency to form a complex with iodine is so strong that it acts effectively as a scavenger for iodine. Even very small amounts of iodine may be removed quickly and completely from an aqueous solution of iodine by contact with nylon 4 whereby the nylon 4 forms a complex with the iodine. The nylon 4 itself develops a pale yellow color while the solution which contained the dissolved iodine is rendered completely colorless. This result was surprising since it had previously been thought that an excess of iodine in the solution was necessary in order to drive the reaction toward the formation of the complex.

The nylon 4 is preferably in a form having a maximum surface area available for complexing the iodine—e.g., tubing knit from a textured yarn is preferable over that knit from flat yarn. It has been found that amorphous or unoriented yarn is more effective than drawn yarn. Waste yarn formed when "spinning on the floor" while waiting for conditions in an extruder to stabilize is particularly useful. Nylon 4 "pulp" or fibrids are also useful.

DESCRIPTION OF THE PREFERRED EMBODIMENT

Figure 1:
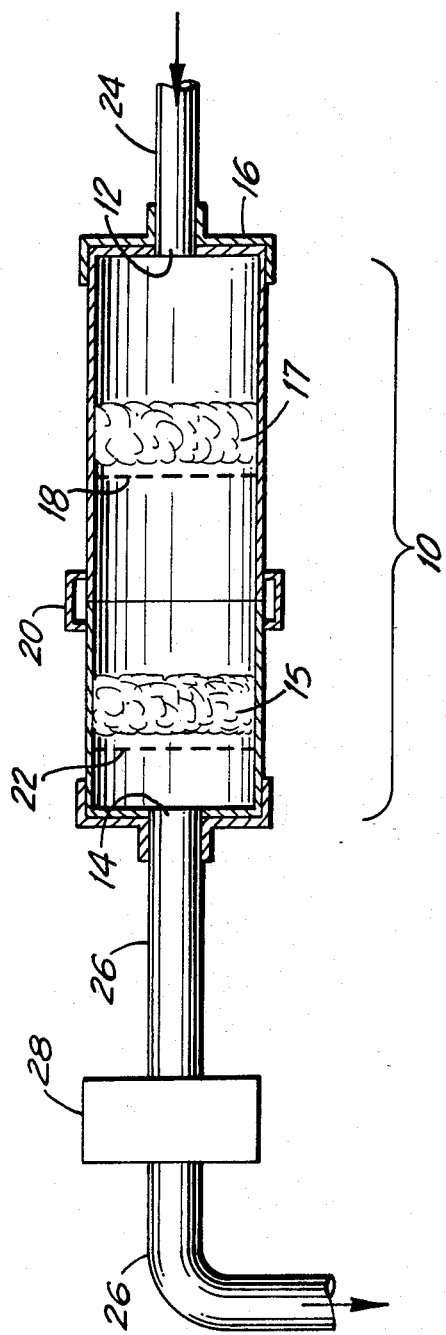
FIG. 1 is a schematic view of one embodiment of the invention for the apparatus for purification of water.

In the purification of water to obtain potable drinking water, iodine is introduced into the impure water by any method, e.g., the method disclosed in U.S. Pat. No. 3,408,295 or in U.S. Pat. No. 4,367,149, or by contacting the water with a nylon 4-iodine complex disclosed in Canadian Patent No. 1,119,748. Sufficient time is allowed for the iodine to destroy the microbial organisms present and then, in order to make the water potable, it is contacted with nylon 4 in a form which provides maximum surface area. Within a short time the water becomes colorless, all the iodine present having transferred to the nylon 4 where it is retained in the form of a complex.

In this system where the nylon 4 is in considerable excess and the iodine concentration is very low, the equilibrium is virtually 100% in the form of the complex. If, on the other hand, a more heavily "loaded" nylon 4-iodine complex (say 5% iodine) is added to water, some of the iodine will leave the complex establishing an equilibrium where some of the iodine is in the water. This provides a means of introducing controlled amounts of iodine into the water.

This purification system may be used to make small portions of potable drinking water in the field or adapted to a larger scale continuous purification process. In the case of larger scale purification systems it may be desirable to rejuvenate the nylon 4 sequestering agent. This is conveniently accomplished by contacting the nylon 4 containing complexed iodine with a solution of sodium bisulfite or sodium thiosulfate. The iodine will be completely removed leaving white nylon 4. The nylon 4 is then rinsed with water to remove the sodium bisulfite or sodium thiosulfate reaction products. The nylon 4 is then ready for reuse. Alternatively, the nylon 4 sequestering agent may be immersed in boiling water for a few minutes after which all the iodine will have been removed and the nylon 4 is ready for reuse.

As mentioned above it is desirable to use a form of nylon 4 which provides maximum surface area. For this reason nylon 4 in staple form is better than, for example, untexturized knit tubing. The staple also packs well in a column.

The ideal nylon 4 material is either a mat or staple form made from textured undrawn yarn. The unoriented fiber absorbs iodine more rapidly and the texturizing provides more surface area. This material also packs better in the column.

It may be advantageous to wash the nylon 4 in whatever form it is used in hot water containing a detergent followed by rinsing to remove any finish or low molecular weight material which may be present.

Where a complex of nylon 4 and iodine is employed to introduce iodine into the water to be purified, the complexed material should be washed before being contacted with the water in order to remove any excess iodine.

The temperature of the water to be treated is not critical, but the temperature is desirably in the range from 0° to 40° C., and preferably in the range of 10° to 25° C.

DESCRIPTION OF THE DRAWING

FIG. 1 is a schematic representation of one embodiment of an apparatus for use in the practice of the process of this invention. Treatment chamber 10 is adapted to maintain complexed material 17 in a first treatment zone or compartment and untreated nylon 4 material 15 in a second treatment zone, and both in position within the flow path of the liquid to be treated. Chamber 10 may be a section of pipe fabricated from metal, opaque or transparent plastic, or from glass, which is provided with inlet 12 and outlet 14 to permit passage of the liquid. In order to facilitate installation of the complexed material, chamber 10 can be provided with a removable fluid-tight cap 16 at its upstream end and coupling which 20 permits separation of the chamber into two parts above the region in which the nylon 4 is retained. Perforated retainers 18 and 22 are securely fit within the interior of chamber 10 and are adapted to maintain the complexed material and nylon 4, respectively, in position and to permit free flow of the liquid through the chamber. Liquid inlet conduit 24 and outlet conduit 26 are adapted to mate in a fluid-tight seal with chamber inlet 12 and outlet 14, respectively. In the embodiment of FIG. 1, pump 28 is adapted to mate with outlet conduit 26 to facilitate and control the rate of flow of the liquid through the treatment chamber 10, and thereby control the contact time of the liquid with the complexed material 17, and the untreated nylon 4 material 15. As will be apparent to one familiar with the art, pump 28 can be positioned upstream of chamber 10 on conduit 24, or the entire system can be gravity fed, with a valve or other restriction means replacing pump 28 to control the rate of flow of liquid through the chamber.

In the operation of the apparatus illustrated in the embodiment of FIG. 1, the water or other liquid to be treated enters chamber 10 through inlet conduit 24 and contacts a mass of complexed material 17. In a preferred embodiment the complexed material is in the form of yarn or fibers which comprise a non-woven structure through which the liquid will uniformly pass without channelling. During the liquid's contact with the complex of iodine and nylon 4, a predetermined amount of iodine passes into the liquid and functions as a biocide to eliminate bacteria contamination or other organisms which are present. The iodine-containing liquid then passes through a similar mass of yarn or non-woven fiber of nylon 4, during which contact, the free iodine complexes with the nylon 4 and is removed from the liquid.

The treated liquid discharged from conduit 26 is free of bacterial contamination and contains no iodine which is detectable by taste or odor.

PREPARATION OF NYLON 4 COMPLEXED WITH IODINE FOR EXAMPLES

For convenience, the complex of nylon 4 and iodine is referred to in these examples as "complexed material." A complex of iodine with nylon 4 knit tubing was prepared as follows. Nylon 4 tubing, 68 grams, was soaked in several liters of water containing a few drops of liquid detergent for 2–3 minutes. Excess detergent solution was squeezed out of the tubing. An iodine solution was prepared by dissolving 56 grams of potassium iodide in approximately 100 ml. tap water followed by the addition of 28 grams of iodine crystals. When all of the iodine had dissolved the solution was diluted to 1400 ml. The wetted undrawn yarn was immersed in the iodine solution, with stirring, for approximately 5 minutes and then removed from the iodine solution, immersed in cold tap water, and rinsed twenty times to remove excess iodine. The treated yarn was hung to dry overnight.

The dry complexed material was brown in color and contained approximately 10% iodine.

The amount of iodine complexed with the nylon 4 material can be varied by adjusting the concentration of the iodine solution and the time during which the nylon 4 is in contact with the solution. Complexed material containing from 1% to 20% of iodine based on the weight of the nylon 4 material can be prepared for use in the invention, and complexed material containing from 5% to 15% of iodine are particulary suitable.

METHOD OF STERILIZATION OF APPARATUS AND ASSAY FOR BACTERIA FOR EXAMPLES

In several of the examples which followed a glass column fitted with a filter at its base was employed. The glass filter has a sufficient pore size so that water flow through the apparatus is not unduly restricted.

The filter column used in the examples was sterilized by exposure to ethanol overnight and between repacking of the column. Tubing used for sample collection was also sterilized with ethanol. The column and tubing were rinsed three times with sterile water prior to packing the column with the complexed material.

The waste water sample was collected from a municipal sewage treatment facility located at Bethlehem, Pennsylvania and stored at 4° C. prior to use. The waste water sample consisted of treated, clarified, unchlorinated municipal waste water, with a pH of 5–6.

Ten milliliter samples for coliform bacterial analysis were collected in duplicate. Samples were stored at 4° C. and were analyzed and showed the presence of Gram negative lactose-fermenting bacilli (coliform) and Gram positive staphylococci, streptococci and enterococci by enumeration of colony forming units/ml on MacConkey agar and Columbia Colinstin Naladixic Acid agar, respectively.

Colorimetric assays for iodine in aqueous solutions were employed having a lower level of detection of 2 micrograms per milliliter ("2µg/ml.")

EXAMPLE 1

A saturated solution of elemental iodine was prepared by adding a sufficient quantity of elemental iodine crystals to one liter of water at room temperature so that undissolved crystals remained after allowing the mixture to stand for a few hours. The liquid was then decanted from the crystals.

50 grams of suitably washed knit tubing made of 100% drawn nylon 4 yarn was immersed in the saturated aqueous iodine solution and within 5 minutes the water was colorless, all the iodine having complexed with the nylon 4. No trace of the characteristic odor or taste of iodine remained in the treated water, and there were no pathogens present.

EXAMPLE 2

A saturated solution of iodine in water was prepared as described in Example 1 and the solution decanted from the crystals. The solution was divided into 2 parts of 500 ml each. To one part was added 5 grams of knit tubing made from drawn yarn and to the other part was added 5 grams of a bundle of undrawn yarn.

The iodine was removed from solution more rapidly (150 seconds) when the undrawn yarn was used. The drawn yarn in the form of knit tubing required twice as long (300 seconds) to remove the iodine.

EXAMPLE 3

The procedure of Example 1 was followed, except that bromine water was substituted for the aqueous iodine solution. The nylon 4 tubing completely decolorized the bromine water within 5 minutes.

EXAMPLE 4

This example demonstrates the release of iodine from complexed material.

The process employed the steps of the filtration of sterile water through the complexed material, supported by the glass column described above, followed by quantitative analysis of iodine in the liquid effluent from the column. A pump was connected to the column in order to draw the water through it and vary the flow rate through the complexed material and nylon 4.

Iodine was readily released from the complexed material upon the addition of water at room temperature. At a flow rate of 450 ml/min a concentration of iodine of 260 $\mu$g/ml was found to be present.

COMPARATIVE EXAMPLE 5

Sterile water and then waste water were filtered through untreated nylon 4 packed in the glass column described above followed by quantitative analysis for viable bacteria in the filtered water.

Analysis of waste water samples collected at flow rates of 120 ml/min and 500 ml/min all showed Gram negative bacteria in a concentration of about 2 or $3 \times 10^3$ CFU/ml, and Gram negative bacteria in a concentration of about $1 \times 10^2$ CFU/ml. No bacteria were found in the sterile water samples.

EXAMPLE 6

Waste water was sequentially filtered through complexed material and nylon 4 packed in the glass column described above, followed by quantitative analysis for viable bacteria and iodine in the liquid effluent from the column.

A total of 16 liters of waste water was collected and analyzed. As the waste water passed through the column it was observed that iodine rapidly moved down the nylon 4 sample in the column. After 16 liters passed through the column, the iodine colored the top portion of the nylon 4 sample brown while the bottom portion was only a faint yellow. Samples were collected after 1 liter, 4 liters, 6 liters, 8 liters, and 16 liters.

Nylon 4 and the complexed material were used in a ratio 2:1, specifically 100 gm:50 gm. This ratio can be adjusted to prevent the excess leaching of iodine from the complexed material into the treated water and its passage through the nylon 4.

Iodine was effectively removed by nylon 4 from the effluent which had first passed through the complexed material as shown by the presence of only 2 $\mu$g/ml of iodine in the effluent in all samples. In addition, all samples showed the complete absence of the gram positive and gram negative bacteria tested for.

EXAMPLE 7

A sample of unoriented nylon 4 yarn having a high surface area especially adapted for removing traces of iodine from water was made as follows:

Filaments of nylon 4 were taken as they emerged from an extruder and collected on a tube in a take-up machine without the application of any finish, or alternatively, simply with the application of water. This undrawn yarn was then texturized, or crimped, and cut into short lengths to form a staple material which, unlike conventional staple, was unoriented. This material packs well in a glass column or filter cartridge with a minimum of voids. Being amorphous it complexes with iodine more rapidly and completely than other forms of fibers.

EXAMPLE 8

With reference to FIG. 1, a treatment chamber 10 is fabricated from two sections of threaded steel pipe three inches in diameter which are joined by threaded coupling 20. Perforated retainers 18 and 22 are fabricated from steel screening having a mesh opening of one-eighth inch and securely fitted within the sections of the chambers, as illustrated. Approximately 50 grams each of complexed material 17 and untreated nylon 4 material 15 in the form of undrawn yarn prepared in accordance with Example 7 are compressed lightly to form pads which are placed on the upstream sides of the retainers 18 and 22, respectively. The sections are joined by coupling 20, and threaded closures 16 having central apertures are placed on the inlet and outlet ends of chamber 10. Inlet conduit 24 and outlet conduit 26 are secured to the closure at either end of the chamber.

A source of waste water from a municipal sewage treatment plant is tested for the presence of bacterial contamination and found to contain coliform, staphlococci, streptococci and enterococci bacterial contamination. Waste water to be treated is admitted from a source, (not shown), into the chamber via inlet conduit 24, and pump 28 is activated; the flow rate is adjusted until a steady flow rate is observed. The treated effluent from outlet conduit is sampled and tested for the presence of bacterial contamination and iodine. Plate assays performed as described above are negative, indicating the absence of bacterial contamination of the types originally determined to be present in the liquid stream before treatment. Tests for free iodine are also negative indicating that no iodine was present at the sensitivity levels of the test, e.g., less than 2 μg/ml.

What is claimed is:

1. A process for purifying water containing pathogens which comprises the steps of (a) adding a halogen selected from the group consisting of bromine and iodine to the water to be purified in a first treatment zone in a quantity sufficient to purify the water; and (b) contacting the water containing halogen with polypyrrolidone in a second treatment zone for a period to time which is sufficient to form a complex of halogen and polypyrrolidone and thereby remove the halogen from the water.

2. The process of claim 1 which includes the further step of regenerating the polypyrrolidone by contact with a compound which decomplexes the halogen.

3. The process of claim 2 wherein the compound is selected from the group consisting of sodium bisulfite and sodium thiosulfate.

4. The process of claim 3 wherein the sodium thiosulfate and sodium bisulfite are in aqueous solution.

5. The process of claim 3 which includes the further step of contacting the polypyrrolidone with clean water to rinse away the decomplexed halogen.

6. The process of claim 1 wherein the polypyrrolidone is in a form having a high surface area to mass ratio.

7. The process of claim 1 where the halogen is added to the water by contacting the water with a complex of iodine or bromine and polypyrrolidone.

8. The process of claims 1 and 7 which includes the step of washing the polypyrrolidone in a solution of aqueous detergent prior to its contact with halogen.

9. The process of claims 1 or 7 in which the water to be treated is at a temperature in the range from 0° to 40° C.

10. The process of claims 1 an in which the water to be treated is at a temperature in the range from 10° to 25° C.

11. The process of claims 1 or 7 which is continuous.

12. The process of claim 11 in which the flow rate of water through the first and the second treatment zones is variable.

13. The process of claim 12 in which a pump is used to vary the flow rate of the water through the treatment zones.

14. The process of claim 12 in which at least one valve is used to vary the flow rate of the water through the treatment zones.

15. The process of claim 7 where the complex of polypyrrolidone and iodine contains from 8% to 12% iodine by weight based on the weight of polypyrrolidone.

16. The process of claim 7 where iodine is complexed with polypyrrolidone which is in a form selected from the group consisting of textured and untextured drawn and undrawn yarn, woven and non-woven fibers, and moistened powder, or a combination of two or more such forms.

17. The process of claim 16 where the iodine is complexed with polypyrrolidone in the form of textured undrawn yarn.

18. Apparatus for water purification which comprises a treatment chamber having water inlet and outlet openings, the chamber having a first treatment compartment adjacent the water inlet, said first treatment compartment containing a material which will introduce iodine into the water which flows through said first treatment compartment, and a second treatment compartment adjacent the water outlet which contains polypyrrolidone in a form which is adapted to permit the uniform free flow of the treated water through the polypyrrolidone and formation of a complex of iodine and polypyrrolidone to thereby remove the iodine from the water prior to its exit from the chamber.

19. The apparatus of claim 18 wherein said material includes a complex of iodine with polypyrrolidone in the first treatment compartment in a form adapted to permit the uniform free flow of the water through the complex of iodine and polypyrrolidone to thereby add iodine to the water.

20. The apparatus of claims 18 or 19 in which the treatment chamber includes means for maintaining the polypyrrolidone in a fixed position with respect to the treatment compartments.

21. The apparatus of claims 18 and 19 in which the polypyrrolidone is in the form of a pad of textured undrawn yarn.

22. The apparatus of claims 18 and 19 which includes means for controlling the flow rate of the water through the treatment chamber.

23. The apparatus of claim 22 wherein the means for controlling the flow rate is a pump.

24. The apparatus of claim 22 the means for controlling the flow rate is at lease one valve.

25. The apparatus of claim 24 where the treatment chamber receives water by gravity feed through a conduit communicating with the inlet opening.

26. An apparatus for treating an aqueous solution with iodine which comprises a conduit through which the solution is adapted to pass, the conduit having an, inlet and an outlet, the interior of the conduit containing polypyrrolidone material complexed with iodine positioned between the inlet and the outlet.

27. The apparatus of claim 26 which includes means for retaining the position of the polypyrrolidone material fixed with respect to the interior of the conduit.

28. The apparatus of claim 26 which includes means for controlling the flow rate of the aqueous solution through the polypyrrolidone material.

* * * * *

UNITED STATES PATENT AND TRADEMARK OFFICE
CERTIFICATE OF CORRECTION

PATENT NO. : 4,888,118

DATED : December 19, 1989

INVENTOR(S) : Barnes, et al

It is certified that error appears in the above-identified patent and that said Letters Patent is hereby corrected as shown below:

Col. 3, line 28, should recite;
"in a second treatment zone, or compartment, and"

Col. 3, line 36 should recite:
"coupling 20 which"

Col. 7, line 31, should recite:
"8. The process of claims 1 or 7"

Col. 7, line 37, should recite:
"10. The process of claims 1 or 7"

Col. 8, line 31, should recite:
"21. the apparatus of claims 18 or 19"

Col. 8, line 34, should recite:
"22. The apparatus of claims 18 or 19"

Col. 8, line 39, should recite:
"24. The apparatus of claim 22 wherein the means".

Signed and Sealed this

Twenty-second Day of June, 1993

Attest:

MICHAEL K. KIRK

Attesting Officer

Acting Commissioner of Patents and Trademarks